US012115695B2

(12) United States Patent
Chlapek

(10) Patent No.: US 12,115,695 B2
(45) Date of Patent: Oct. 15, 2024

(54) PORTABLE WOOD LOG SPLITTER

(71) Applicant: Tomas Chlapek, Zakovice (CZ)

(72) Inventor: Tomas Chlapek, Zakovice (CZ)

( * ) Notice: Subject to any disclaimer, the term of this patent is extended or adjusted under 35 U.S.C. 154(b) by 227 days.

(21) Appl. No.: 17/721,171

(22) Filed: Apr. 14, 2022

(65) Prior Publication Data

US 2022/0242005 A1 Aug. 4, 2022

Related U.S. Application Data

(63) Continuation of application No. PCT/CZ2020/050079, filed on Oct. 12, 2020.

(30) Foreign Application Priority Data

Oct. 17, 2019 (CZ) ................................ CZ2019-644

(51) Int. Cl.

*B27L 7/04* (2006.01)
*B27B 17/00* (2006.01)
*B27L 7/02* (2006.01)
*B27L 7/06* (2006.01)

(52) U.S. Cl.

CPC ............ *B27L 7/04* (2013.01); *B27B 17/0016* (2013.01)

(58) Field of Classification Search

CPC ........... B27L 7/02; B27L 7/04; B27B 17/0016
See application file for complete search history.

(56) References Cited

U.S. PATENT DOCUMENTS

| | | | | | |
|---|---|---|---|---|---|
| 3,993,113 | A | * | 11/1976 | Thackery | B27L 7/04 144/195.7 |
| 4,026,337 | A | * | 5/1977 | Thackery | B27L 7/04 403/3 |
| 4,160,472 | A | * | 7/1979 | Blackstone | B27L 7/04 144/194 |
| 4,188,987 | A | | 2/1980 | James | |

(Continued)

FOREIGN PATENT DOCUMENTS

| | | | |
|---|---|---|---|
| DE | 3423428 | A1 | 1/1986 |
| DE | 3425439 | A1 | 2/1986 |

(Continued)

OTHER PUBLICATIONS

Tsalkovsky Valery, published on YouTube on Dec. 8, 2015, from Russia, attachment for chainsaw. https://www.youtube.com/watch?v=TG3n2gifw1M.

*Primary Examiner* — Mohammed S. Alawadi
(74) *Attorney, Agent, or Firm* — DEVICE PATENT LLC

(57) ABSTRACT

Disclosed herein is a portable wood log splitter comprising a power unit and a work tool. The power unit comprises an engine and a gear box while the work tool comprises a drive shaft having a spreading mechanism and a splitting threaded cone. In some embodiments, the work tool is releasable from an output shaft of the gear box. The drive shaft of the work tool is hollow and provided with a thread on the outer circumference to drive the spreading mechanism. A nut with a toothed disc resides on the thread and able to shift in the axial direction of the drive shaft rotation axis due to rotation of the drive shaft. In operation, the splitting threaded cone is driven by force of the power unit to initially fracture a log, then using the spreading mechanism, the portions of the split log are fully separated under power.

19 Claims, 7 Drawing Sheets

(56) References Cited

U.S. PATENT DOCUMENTS

| | | | | | |
|---|---|---|---|---|---|
| 4,403,635 | A | * | 9/1983 | York | B27L 7/04<br>144/194 |
| 4,491,164 | A | | 1/1985 | Waikas et al. | |
| 5,107,911 | A | | 4/1992 | Plakotaris | |
| 5,971,044 | A | | 10/1999 | Valentin | |

FOREIGN PATENT DOCUMENTS

| | | | |
|---|---|---|---|
| DE | 202013002742 | U1 | 6/2013 |
| DE | 202013105941 01 | | 4/2014 |
| EP | 0724938 | A1 | 8/1996 |
| EP | 0830925 | A1 | 3/1998 |
| WO | 2015097571 | A1 | 7/2015 |

* cited by examiner

PORTABLE WOOD LOG SPLITTER

CROSS REFERENCE TO RELATED APPLICATIONS

This application claims priority to International Patent Application No. PCT/CZ2020/050079 filed Oct. 12, 2020 which claims benefit to Application No. PV 2019-644 filed Oct. 17, 2019 in the Czech Republic. The entire disclosure of these applications are hereby incorporated by reference and relied upon.

BACKGROUND OF THE INVENTION

Field of the Invention. The invention relates to a portable splitter for splitting wood, in particular for splitting of parts of tree trunks.

Description of Related Art. As known, one of the methods utilized for splitting a wooden log, usually a log in a meter length, is based on the use of the principle of a rotating threaded cone, which, thanks to a thread on its circumferential casing, can bore easily into a wooden log, divide it into two pieces and simultaneously due to its wedge shape spread the split wood pieces apart.

Devices of this kind are known from the description of the prior art in various versions. Usually, they are used in firewood processing for splitting wooden logs in meter lengths. They comprise a power unit and one or two rotating splitting threaded cones. Portable devices of this kind are known, for instance, from the German patent application DE3425439, U.S. Pat. No. 4,491,164, German utility model DE29616566 or international patent application PCT WO2015097571.

From the German patent application DE3425439 a portable wood cone splitter is known, the splitter being conceived as an attachment to be coupled to the chain saw power unit. This device can be operated either with one threaded cone and the transfer of the reaction torque onto the operator is prevented by means of an anti-torque bar (stop), or by using two counter-rotating threaded cones. In both cases the axes of the threaded cones including the axis of the supporting arm are parallel to the axis of the output drive shaft of the chain saw unit. The whole wood log splitter is held by means of the chain saw handles in a different work position than that employed when working with the chain saw alone and during splitting the said log splitter is placed on the wood log and moved vertically from above downward. A disadvantage of this device is given by the fact that control of revolutions of the chain saw engine is not, from the ergonomic point of view, adjusted correctly for holding the entire splitter in hands from the side of the chain saw unit.

From the U.S. Pat. No. 4,491,164 a portable wood cone splitter is known, the said splitter having a splitting screw cone fitted on an auxiliary driving unit fixed to the chain saw power unit with the cone axis oriented parallel to the longitudinal axis of the chain saw. The device is equipped with an impact driven unit situated inside the cone in its back part, the said impact driven unit generating vibrations transferred onto the cone surface, thus eliminating generation and transfer of the reaction torque onto the chain saw operator when the cone is boring into the wood log. An advantage of this device consists in the fact that it forms a compact splitter with minimum installation requirements and is easily transferrable. A disadvantage of this equipment is that vibrations and noise generated by the impact driven unit constitute an increased health risk for the device operator.

From the German utility model DE29616566 a portable wood cone splitter is known, the said splitter having been made exclusively as a splitting device. In this splitter, axes of the engine output shaft, gear box and the splitting threaded cone are co-linear and the whole device constitutes one compact unit. A characteristic feature of this device is that two adjustable anti-torque bars (stops) preventing transfer of the reaction torque on the splitter operator when the splitting screw cone is boring into the wood log are located on the sides of the device and that two handles perpendicular to the axis of the threaded cone rotation are provided making possible for the splitter operator to hold the whole splitter during its operation. A disadvantage of this splitter is its great weight and difficult handling.

From the international patent application PCT WO2015097571 a portable wood cone splitter is known, wherein the splitter is designed exclusively as a splitting device. In one casing the said device contains an engine and a gear box with two output parallel and counterrotating drive shafts coming from the gear box, wherein a splitting threaded cone is mounted on each drive shaft. The rotation axes of both splitting cones are parallel to the longitudinal axis of the whole device. An advantage of this device is given by the fact that it contains two counter-rotating threaded cones, which bore simultaneously into the wood log while no reaction torque transferrable onto the device operator is generated here. A disadvantage of this device is that when the cone tops are placed between different longitudinal fibers of the wood log (on its outer casing), even a third part of the wood log can be produced between the two main split pieces, while the third part of the wood log is formed with a thin bundle of wood fibers connecting the two main divided parts of the wood log. Another disadvantage is that the drive shafts and bedding thereof can be subjected to a great stress due to a non-uniform load of the cones when the cones are being bored into the wood log. A problem of known portable wood log splitters with respect to their operation is that they use one-phase process of wood log splitting, wherein by means of a single rotating threaded cone the wood log is split and simultaneously, thanks to a circular base of the same cone, the split wood log pieces are separated, while using the great diameter of the threaded cone flat base to achieve the maximum wood log separation. When the rotating threaded cone is employed a general disadvantage thereof is that with increasing diameter of the cone cross-section boring into the wood log, the reaction torque increases, the force effects of which are in case of the portable splitter being transferred onto the log splitter operator. This requires a great muscle effort by the splitter operator to prevent rotation of the whole device, particularly in case when the wood log has not yet been split completely. A problem of known log splitters with respect to their design is that in order to eliminate the transfer of the reaction torque onto the splitter operator due to a great diameter of the threaded cone base, either an anti-torque bar (stop) connected firmly with the power unit is used, the anti-torque bar (stop) running into the lateral wall of the wood log thus preventing generation of the reaction torque during splitting, or the concept of two counterrotating threaded cones boring simultaneously into the wood log is utilized. However, both above types of portable wood splitters are very heavy, which results in a poor user comfort.

Another common problem of the present wood log splitters is that they are not able to separate the split pieces of the wood log to a distance greater than the cone base diameter. Due to this, the split pieces of the wood log must be subsequently separated from each other by hand because they are frequently still joined with remnants of wood fibers. Another problem is that the portable wood log splitters known up to now have great dimensions and require great space for storage, for instance when their transport in the car boot (car luggage compartment) is required.

Also, a common disadvantage of all the above devices is the fact that they are very complicated with respect to their design and, consequently, expensive. In addition, as portable splitters they are very heavy and bulky to carry, which prevents their greater efficient use in practice. Another major disadvantage is that handling of these devices is not ergonomically friendly for their operators. An absolutely essential practical disadvantage is that these devices are not able to separate the split pieces of the wood log to a greater distance than is the diameter of the threaded cone base.

SUMMARY OF THE INVENTION

A portable wood log splitter according to this invention contributes to a considerable extent to elimination of the above problems and shortcomings of known devices. The nature of the invention consists in the fact that in some embodiments the device forms a building kit comprising a power unit and a work tool, the said power unit comprising an engine and a gear box and the said work tool comprising a drive shaft complete with a spreading mechanism and a splitting threaded cone, and that the said work tool and the output shaft of the gear box are provided with parts of an element enabling a repeatable connection and disconnection of the splitting threaded cone. The drive shaft of the work tool is hollow and provided with a thread on its outer circumference to create the spreading mechanism. A nut connected with a toothed disc is screwed in on the outer circumference, the said nut being able to move in the axial direction of the drive shaft rotation axis due to rotation of the drive shaft. Further, a freely revolving circular disc with a smooth outer surface secured against movement in the axial direction of the drive shaft rotation axis is inserted on the drive shaft between its connection onto the gear-box output shaft and the said nut with the toothed disc, while an end stud with an element for a repeatable connection and disconnection of the splitting threaded cone is screwed in the end part of the drive shaft. A telescopic spiral spring is inserted between the nut with the toothed disc and the end stud of the drive shaft, the said telescopic spiral spring moving the nut with the toothed disc back to its starting position during its expansion and simultaneously functioning as a cover of the thread on the drive shaft.

The element for the repeatable connection and disconnection of the work tool drive shaft and the output shaft of the gear box can be advantageously a ball coupling complete with a sleeve controlled manually by shifting in axial direction, the said sleeve being blocked against movement in the locked position by means of a compression spring, and with balls movable in the direction perpendicular to the axis of the output shaft of the gear box and partially sunk into the groove of the drive shaft blocked against movement by means of the sleeve in its locked position. The transfer of the torque is performed through the grooved connection between the output shaft and drive shaft. An element for the repeatable connection and disconnection of the splitting threaded cone to and from the end stud of the drive shaft is advantageously a bayonet coupling.

In alternative embodiments the power unit of the device can consist of an engine and a gear box, which is its integral part or can be formed by a building kit of the chain saw power unit and of an independent auxiliary gear box, which is fixed in a dismantable way onto a chain saw cutting blade flange.

In alternative arrangements of the device the axis of the engine output shaft can be perpendicular to the rotation axis of the gear box output shaft while the gear box can be two-gear or multi-gear one. The first up to n-th gear is formed by an indented belt gear or by front gearwheels while the last gear is formed by a bevel gear train. With the crown gear of the bevel gear the hollow gear box output shaft is linked. The bevel gear inserted into the gear box can be advantageously self-locking while the shaft of the angle transmission bevel pinion passes along the crown gear. Bearings for placement of the pinion gear are located on both sides of the crown gear.

In other alternative arrangement of the device the axis of the engine output drive shaft can be parallel to the rotation axis of the gear box output shaft, the gear box being multi-gear one with the first and the last gears being formed by front gearwheels, or is arranged as a planet one.

A firm, collapsible or demountable anti-torque bar (stop) is connected advantageously to the carrier structure of the power unit or the auxiliary gear box, a part of which is also the first handle for elimination of the reaction torque produced during operation of the work tool, the said handle being directed toward the operator's left hand. The longitudinal axis of the anti-torque bar (stop) in the horizontal position is perpendicular or deviated from the perpendicular axis by an angle less than 30° with respect to the rotation axis of the gear box output shaft and the distance of the anti-torque bar (stop) remotest point from the rotation axis of the work tool is 300 mm at minimum.

The power unit can also be provided with the second handle complete with engine rotation controller, the longitudinal axis of which is parallel to the axis of the work tool.

The thread profile on the outer circumference of the work tool drive shaft can be advantageously trapezoidal or can have a profile enabling circulation of the balls between the thread on the outer circumference of the drive shaft and the nut in case a screw known as a ball screw is used.

The end stud has advantageously two rectangular projections with a shape offset on the circumference, the symmetry longitudinal axes of the said projections being perpendicular to its rotation axis and forming an angle of 180° between themselves, while the profile of the inlet opening of the splitting threaded cone being an offset of the end stud cross-section in place of its rectangular projections. The splitting threaded cone, on the side near its base, has the inlet opening provided with a recess for insertion of the end stud and a flat annulus-shaped spring is inserted into the recess space. This flat annulus-shaped spring is bent and secured against shift and rotation by means of two hooks placed symmetrically in the circumference around the rotation axis in the openings of the splitting threaded cone. The bayonet coupling is created by inserting the end stud into the inlet recessed opening of the splitting threaded cone. By turning the end stud a little inside the body of the splitting threaded cone by an angle ranging from 10° to 90° it is secured against an axial movement in the direction outward from its base and the rectangular end stud projections will get behind the offset edge of the inlet opening profile of the splitting threaded cone.

Surface roughness of the thread profile of the splitting threaded cone is advantageously less than Ra 0.4 μm.

A tube for supply of lubricating oil to the thread surface of the splitting threaded cone runs advantageously through the hollow output shaft of the power unit, then inside the hollow drive shaft and through the cavity around the central axis of the splitting threaded cone. Ball or conical valves for opening and closing of lubricating oil flow directed toward the thread surface of the splitting threaded cone are located inside the hollow output shaft of the power unit, on the entry part inside the hollow drive shaft and in the hollow end stud. The lubricating oil is conveyed onto the thread surface of the splitting threaded cone by action of gravitational force. The flow of the lubricating oil to the thread surface of the splitting threaded cone is opened by a shift of the splitting threaded cone on the end stud in the range of 0 to 10 mm in the direction of the power unit by the effect of the operator's force against the pressure of the flat ring via the valve located in the end stud and closed by shift of the splitting threaded cone in the opposite direction into its starting position by the effect of the force generated by the compressed flat spring.

The fundamental idea of this invention is that the log splitting process is divided into two work stages. In the first stage the wooden log is split by means of the revolving threaded cone, the base diameter of which as well as the apical angle are less than the base diameter and the apical angle of the devices known so far. Thanks to this the threaded cone does not generate so great reaction torque during boring into the wood mass and due to this the reaction torque can be eliminated merely by correct holding of the log splitter and by placing the whole device on the operator's body while the overwhelming value of the reaction torque is eliminated by placing the anti-torque bar (stop) on the surface of the operator's left thigh.

If the wood log is not divided completely into two separate pieces by means of the threaded cone but only a crack (split) releasing the squeeze of the threaded cone is produced with the said crack (split) permitting taking out of the portable device freely from the log, then, in the second work stage, it is possible to insert into the crack the spreading mechanism situated between the power unit and the splitting threaded cone. This mechanism operates in such a way that two discs fitting tightly to each other are inserted into the crack created by the threaded cone while the first disc is provided with teeth on its circumference that bite into one part of the wood log and the second disc rests against the other part of the wood log. After starting rotation of the drive shaft, the toothed disc begins to move since it is connected with the drive shaft via the threaded profile, which means that these two discs start to separate and carry away parts of the log. Thanks to this the split parts of the wood logs are separated to a great distance from each other and the log separation process is completed.

In case that complete separation of the log into two separate parts by means of threaded cone rotation did not occur and simultaneously no crack was produced in the log and instead the threaded cone got squeezed by way of its boring into the log it is possible to disconnect the portable wood log splitter with the drive shaft complete with the spreading mechanism from the screw cone via the mechanical bayonet coupling, mount another screw cone on the end stud of the drive shaft and repeat the splitting process till the wood log is split and/or a crack is created for mounting of the spreading mechanism.

The portable wood log splitter according to this invention meets work safety requirements aimed at eliminating generation and transfer of the reaction torque force effects on the operator during boring of the splitting cone into the wood log. The resultant safety of the wood log splitter operation is given by a combination of several factors. The first factor is a correct setting of threaded cone geometrical characteristics so that both base diameter and the apical angle are smaller than the base diameter and the apical angle of the devices known up to now. Thanks to this the threaded cone does not generate so high reaction torque when bored into the wood mass. The second factor is the roughness value of the threaded area outer surface equal to Ra less than or equal to 0.4, while a very smooth thread surface reduces the friction value of the slip steel-wood combination. The third factor is transfer of micro-vibrations from the combustion engine onto the threaded cone surface thanks to a mutual rigid mechanical connection, which makes penetration of the cone into the wood mass easier. The fourth factor is bringing of the lubricating oil onto the surface of splitting cone thread areas from the tank located in the power unit by means of the oil distribution tubing, which passes through the hollow drive shaft and the threaded cone up to its surface. Thanks to the above factors the transfer of the reaction torque onto the operator can be eliminated merely by holding the wood log splitter correctly and by placing the whole splitter onto the operator's body while the predominant value of the reaction torque is eliminated by placing the anti-torque bar (stop) on the operator's left leg thigh.

The most important advantage of the device according to the invention is a highly efficient and ergonomically very comfortable work during wood log splitting and when handling the log splitter with hands. The use value of the portable wood log splitter is increased substantially by the spreading mechanism. For separation of the split parts of the wood log it is not necessary to use an additional great human muscle force anymore. Since the device contains a minimum number of components its resultant weight is very low and approaches the weight of the high performance chain saws available on the market. Simultaneously, the minimum number of the components results in a decrease of production costs and in a favorable purchase price for the end-user. Work safety when working with the device is secured by a correct setting of splitting cone characteristics and by ergonomically most suitable position of the wood log splitter in relation to the splitter operator.

A great advantage is also the fact that prior to splitting, handling heavy wood logs cut to meter lengths is not necessary and after dividing the logs into several smaller pieces by means of the portable splitter the separate pieces can be loaded manually, for instance on a car trailer, quite easily. Thanks to this, no big technical means, such as a tractor with a transport trailer, a heavy hydraulic splitter hung on a tractor three-point towing hitch or a hydraulic crane for wood log handling, are required. The entire logistic chain of firewood processing from tree felling to transport home can now be managed by using a chain saw and the portable wood log splitter in combination with the use of a common car and a trailer connected to the car. As a result, all wood\working technical means are decreased in size, raw-material sources are saved and carbon footprint connected with their manufacture is reduced.

Another significant advantage is that the device constitutes a building kit comprising the power unit and the work tool while the work tool need not be the wood log splitter but for instance a cone with a speed-reducing gear for tree felling, a log skidding winch, screw propeller for small boats, various kinds of drills, water pump, drive of various hoists, adapter drives of grass cutter blade, etc. and all this extends significantly use potentials of this device into many fields of the human activity.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Example 1

Figure 1:
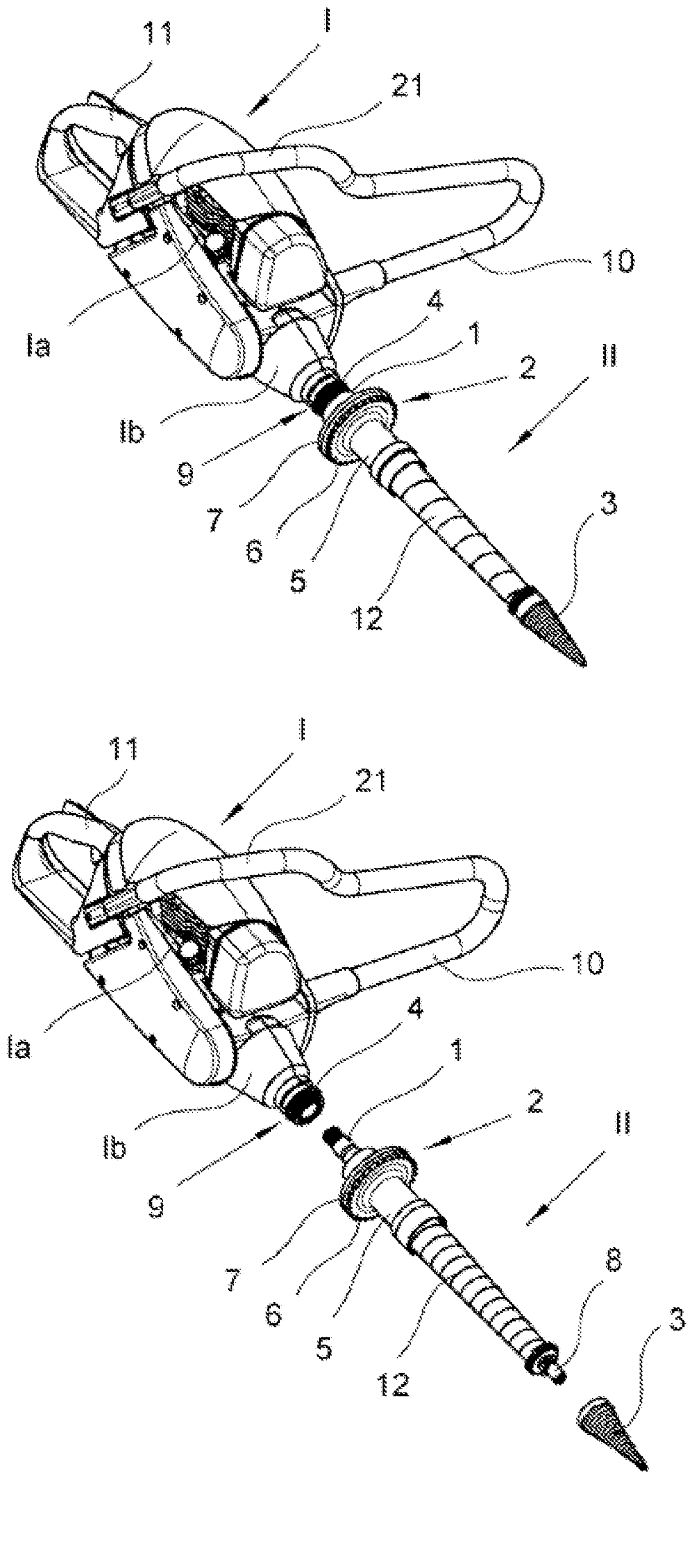
FIG. 1 depicts an overall arrangement of the device according to the invention in an axonometric view—a variant wherein the power unit of the device comprises an engine and a gear box, which is its integral part (illustrated here in an operable configuration at the top and partially exploded at the bottom)
Figure 3:
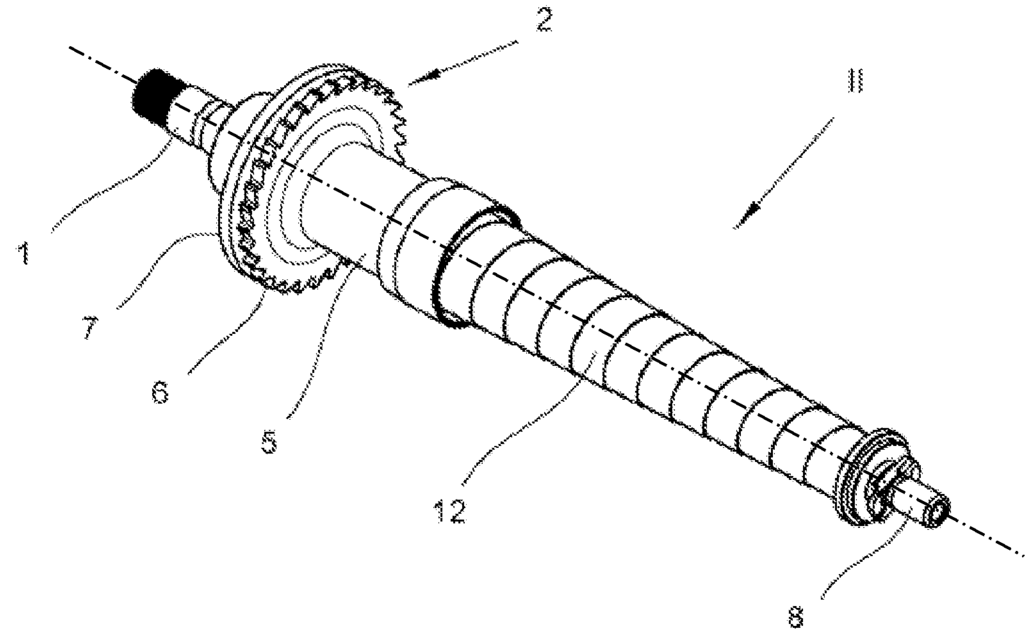
FIG. 3—is a detail of the spreading mechanism in an axonometric view (illustrated here in an operable configuration at the top and partially exploded at the bottom)
Figure 3:
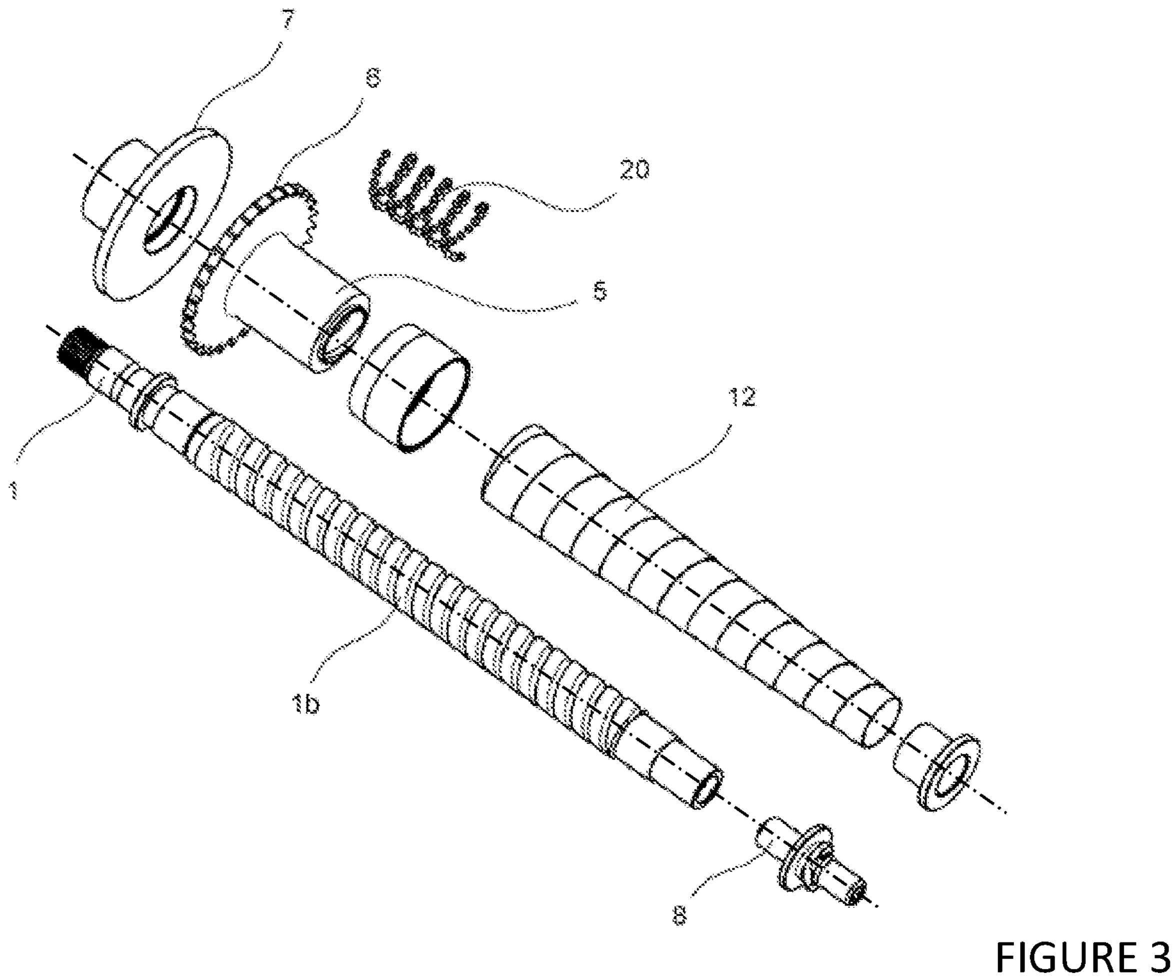

The portable wood log splitter in the exemplary embodiment of the invention comprises a building kit of a power unit and of a work tool. The power unit I consists of an engine Ia and a gear box Ib, which is its integral part (see FIG. 1). The work tool II consists of a drive shaft 1 complete with a spreading mechanism 2 and of a splitting threaded cone 3 (see FIG. 1). The work tool II and an output shaft 4 of the gear box Ib are provided with parts of an element for a repeatable connection and disconnection of the splitting threaded cone. The drive shaft 1 of the work tool II is hollow and to produce the spreading mechanism 2 (see the detail in FIG. 3) is on the outer circumference provided with a drive shaft thread 1*b*, on which a nut 5 connected with a toothed disc 6 is screwed, the said nut being able to shift in the axial direction of the drive shaft 1 rotation axis due to rotation of the drive shaft 1 on the drive shaft 1 between its connection to the output shaft 4 of the gear box Ib and the said nut 5 with the toothed disc 6, a freely rotating circular disc 7 having a smooth outer surface and being secured against a shift in the axial direction of drive shaft 1 rotation axis is inserted, the shaft 1 being its integral part.

In the terminal part of the drive shaft 1 an end stud 8 is screwed, the said end stud 8 having an element for a repeatable connection and disconnection of the splitting threaded cone 3. Between the nut 5 with the toothed disc 6 and the end stud 8 of the drive shaft 1, a telescopic spiral spring 12 is inserted, which shifts the nut 5 with the toothed disc 6 back to its starting position and simultaneously serves as a casing of the thread 1*b* on the drive shaft 1 during its expansion.

Figure 4:
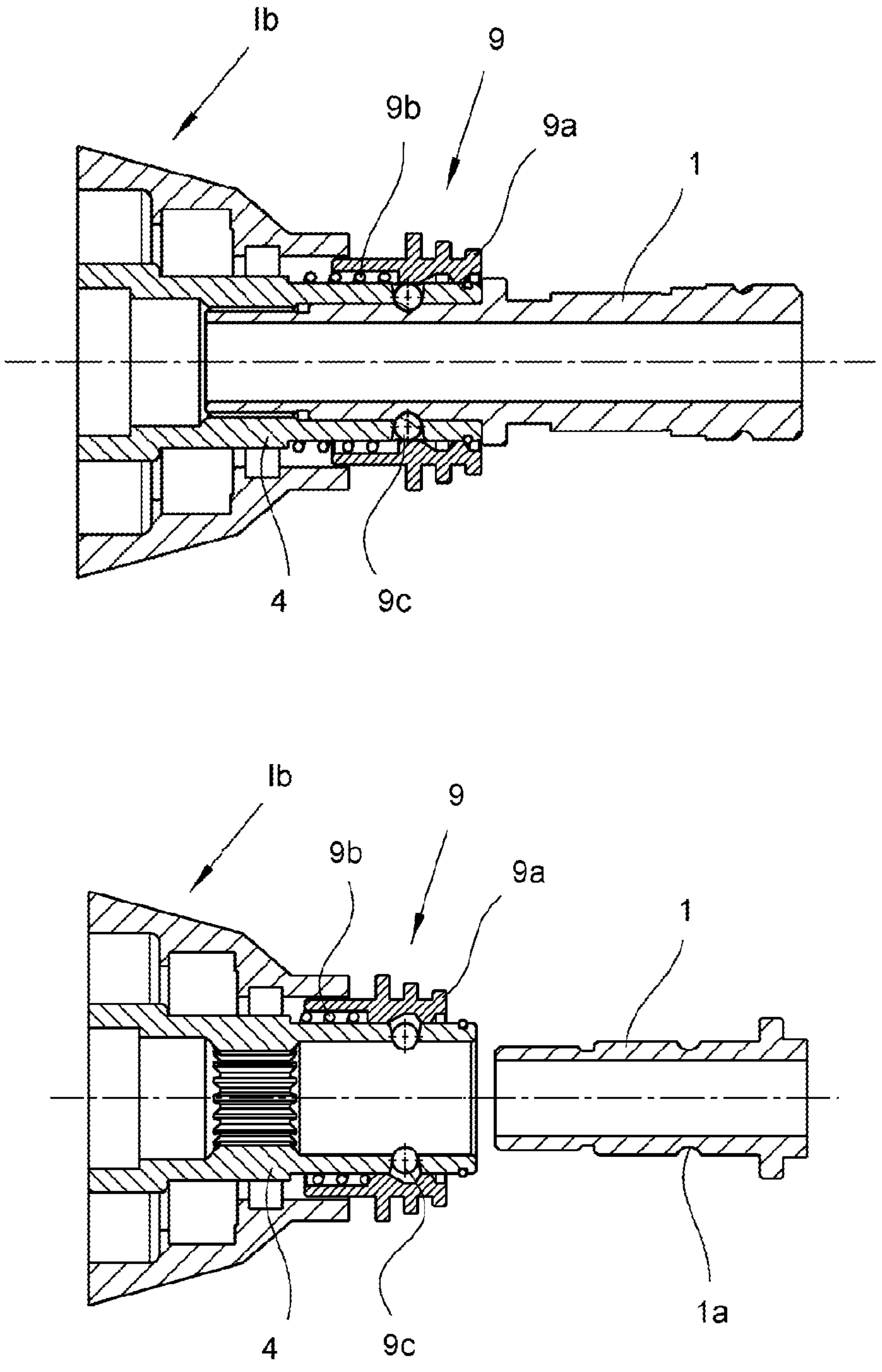
FIG. 4—is a detail of operation of the ball coupling of the gear box output shaft and the drive shaft of the work tool in section (illustrated at top with drive shaft coupled and at bottom with drive shaft uncoupled)
Figure 5:
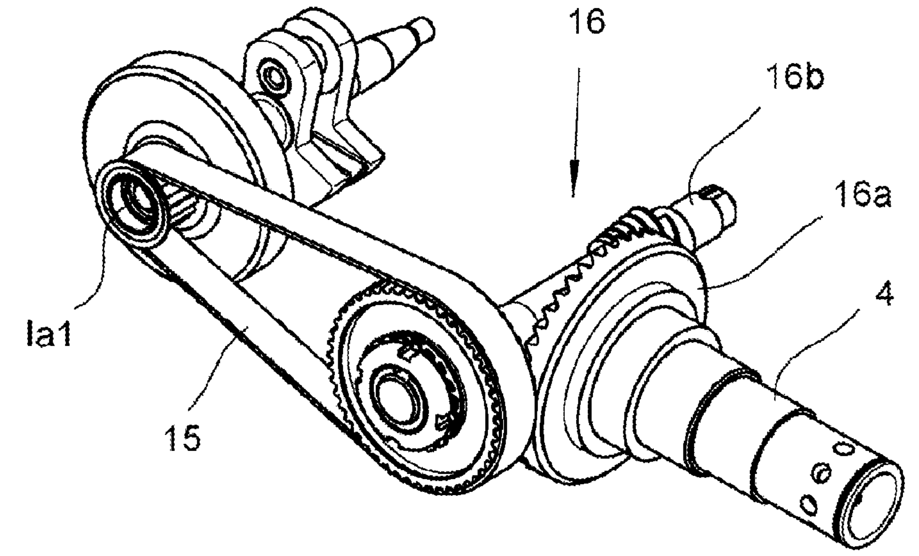
FIG. 5—is a detail view of an arrangement of the gear box with the bevel gear (the illustration at the top and the illustration at the bottom are from opposed viewing angles)
Figure 5:
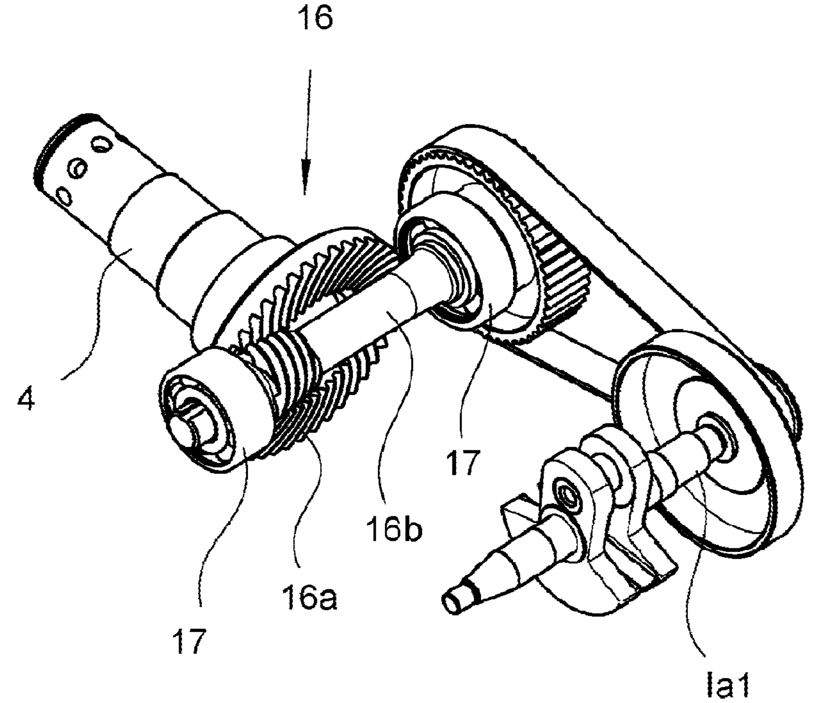

The element for the repeatable connection and disconnection of the drive shaft 1 of the work tool II and the output shaft 4 of the gear box Ib is a ball coupling 9. (see the detail in FIG. 4). The ball coupling 9 is fitted with a sleeve 9*a* controlled manually by shifting in axial direction, the said sleeve 9*a* being blocked against movement in the locked position by means of a compression spring 9*b* and balls 9*c* movable in the direction perpendicular to the axis of the output shaft 4 of gear box Ib and partially sunk into the groove 1*a* of the drive shaft 1 blocked against movement with the sleeve 9*a* in its locked position. The torque is transferred via the groove connection between the output shaft 4 and the drive shaft 1.

Figure 6:
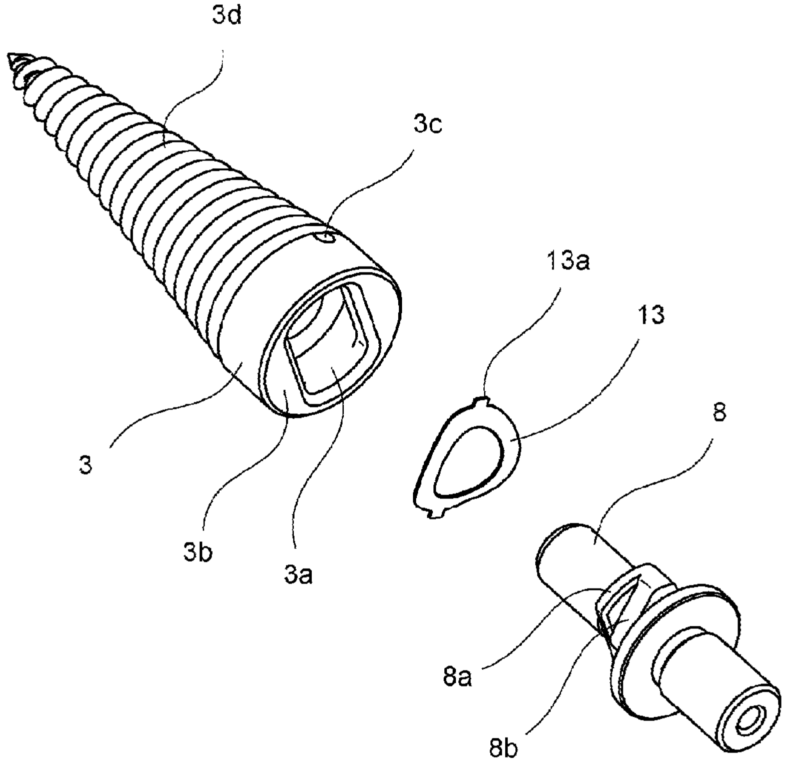
FIG. 6—is an exploded detail of an arrangement of the bayonet coupling of the end stud and the splitting cone.
Figure 7:
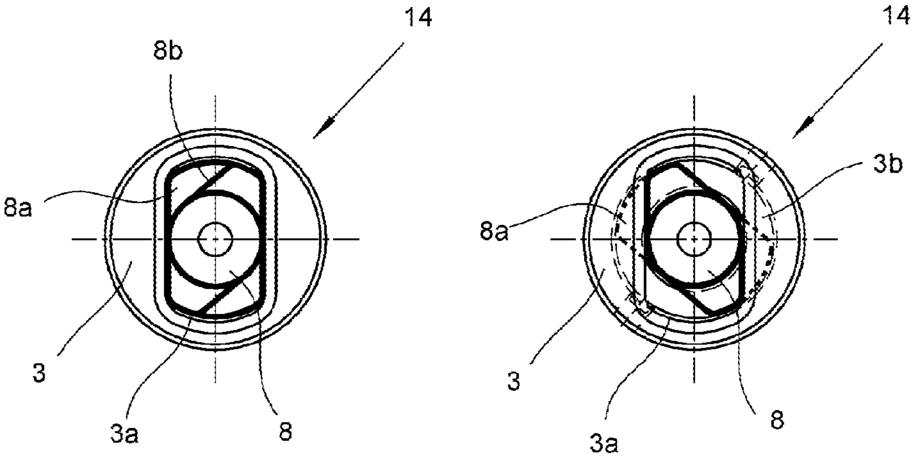
FIG. 7—is an end view illustration of bayonet coupling operation.

The element for the repeatable connection and disconnection of the splitting threaded cone 3 to the end stud 8 of the drive shaft 1 is a bayonet coupling 14 (see the detail in FIG. 6). The end stud 8 is provided with two rectangular projections 8*a* with a shape off set 8*b*, the said rectangular projections 8*a* having longitudinal symmetry axis perpendicular to its rotation axis and forming an angle of 180° between themselves, while the profile of the inlet opening 3*a* of the splitting threaded cone 3 is an offset of end stud cross-section in place of its rectangular projections 8*a*. The splitting threaded cone 3 has on the side near its base the inlet opening 3*a* provided with a recess 3*b* for insertion of the end stud 8. A flat annulus shaped spring 13 is inserted into the recess space, the said flat annulus shaped spring 13 being bent and secured against shift and rotation by means of two hooks 13*a* placed symmetrically in the circumference around the rotation axis in openings 3*c* of the splitting threaded cone 3. The bayonet coupling 14 is created by inserting the end stud 8 into the inlet opening 3*a* with the recess 3*b* of the splitting threaded cone 3. By turning the end stud 8 a little inside the body of the splitting threaded cone 3 by an angle ranging from 10° to 90° it becomes secured against an axial movement in the direction outward from its base and the rectangular projections 8*a* of the end stud 8 will get behind the offset edge of the inlet opening profile 3*a* of the splitting threaded cone 3 (see the detail in FIG. 7).

In the device in the exemplary embodiment the axis of the output shaft Ia1 of the engine Ia is perpendicular to the rotation axis of the output shaft 4 of the gear box Ib. In this case the said gear box Ib is both two as well as multi-gear one, the first up to n-th gear being formed by an indented belt drive 15 or a front gearwheels drive and the last gear by a bevel gear train 16. With the crown gear 16*a* of the bevel gear 16 the hollow output shaft 4 of the gear box Ib is connected.

The bevel gear 16 inserted into the gear box Ib is self-locking and the shaft of the pinion gear 16*b* of the bevel gear 16 passes along the crown gear 16*a* while bearings 17 for placement of the pinion gear 16*b* are located on both sides of the crown gear 16*a*.

A firm, collapsible or demountable anti-torque bar (stop) 10 is connected to the carrier structure of the power unit I or the auxiliary gear box Ib, a part of which is also the first handle 21 for elimination of the reaction torque produced in operation of the work tool II and directed toward the operator's left hand. The longitudinal axis of the anti-torque bar (stop) 10 in the horizontal position is perpendicular or from the perpendicular axis deviated by an angle less than 30° with respect to the rotation axis of the output shaft 4 of the gear box Ib and the distance of the anti-torque bar (stop) 10 remotest point from the rotation axis of work tool II is 300 mm at minimum.

The power unit I is provided with the second handle 11 complete with engine Ia rotation controller, the longitudinal axis of which is parallel to the axis of the work tool II.

The thread Ib profile on the outer circumference of drive shaft 1 of the work tool II is trapezoidal one or has a profile enabling circulation of the balls 20 between the thread 1*b* on the outer circumference of the drive shaft 1 and the nut 5 in case a screw known as a ball screw is used.

Surface roughness of the thread profile 3*d* of the splitting threaded cone 3 (see FIG. 7) is less than Ra 0.4 μm.

Figure 8:
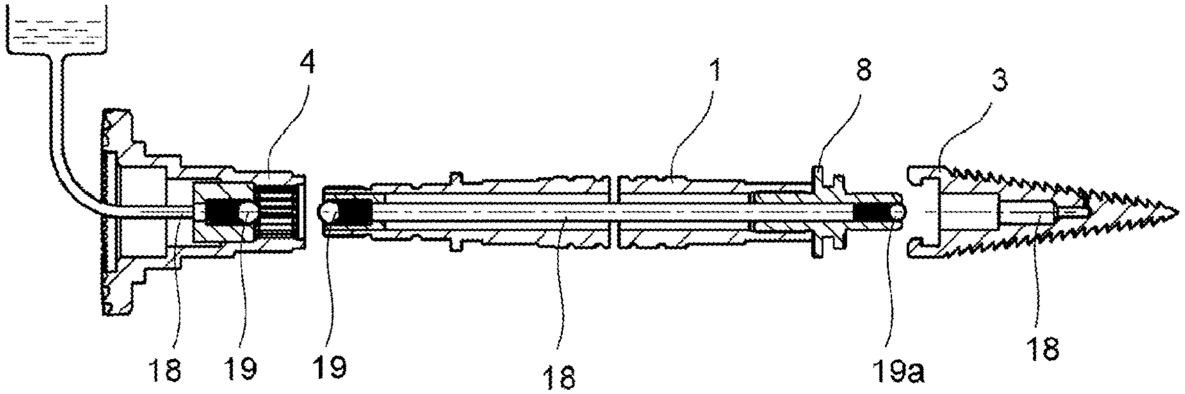
FIG. 8—is a partially exploded sectional view of the device showing lubricating oil supply tube.

A tube 18 for supply of lubricating oil to the thread 3*d* surface of the splitting threaded cone 3 runs through the hollow output shaft 4 of the power unit I, then inside the hollow drive shaft 1 and through the cavity around the central axis of the splitting threaded cone 3 (see FIG. 8). Ball or conical valves 19 for opening and closing of lubricating oil flow directed toward the thread 3*d* surface of the splitting threaded cone 3 are located inside the hollow output shaft 4 of the power unit I, on the entry part inside the hollow drive shaft 1 and in the hollow end stud 8. The lubricating oil is conveyed onto the thread 3*d* surface of the splitting threaded cone 3 by action of gravitational force.

Figure 9:
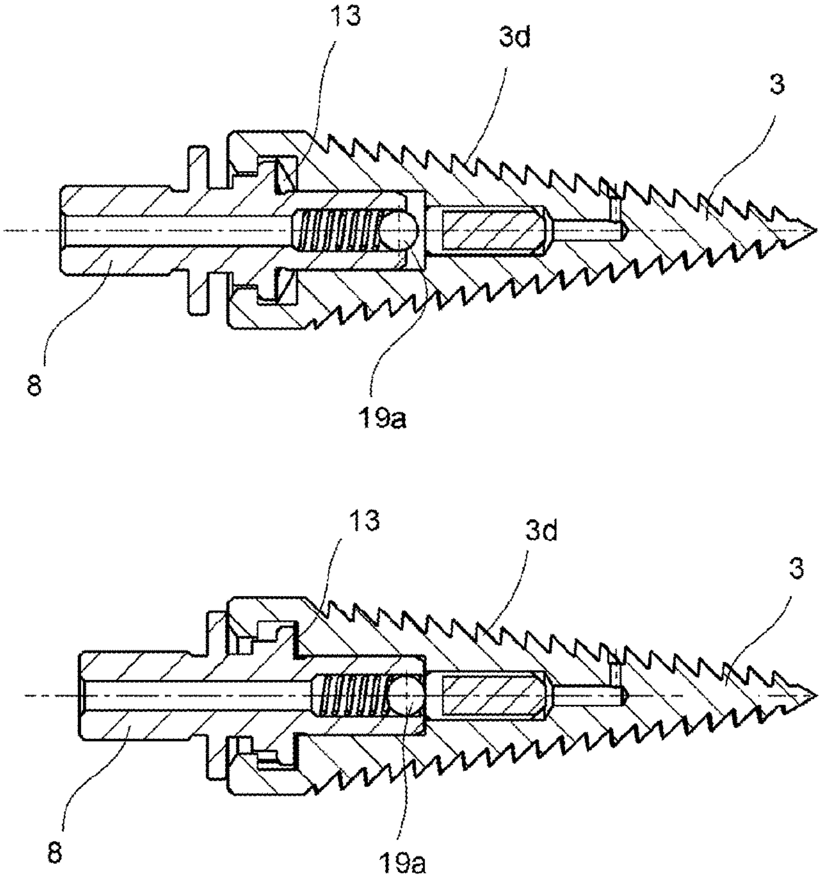
FIG. 9—are sectional illustrations of opening and closing of the lubrication oil flow inside the threaded cone.

The flow of the lubricating oil to the thread 3*d* surface of the splitting threaded cone 3 is opened by a shift of the splitting threaded cone 3 on the end stud 8 in the range of 0 to 10 mm in the direction of the power unit I by the effect of the device operator's force against the pressure of the flat ring 13 via the valve 19*a* located in the end stud 8 and closed by shift of the splitting threaded cone 3 in the opposite direction into its starting position by the effect of the force generated by the compressed flat spring 13 (see the detail in FIG. 9).

Example 2

Figure 2:
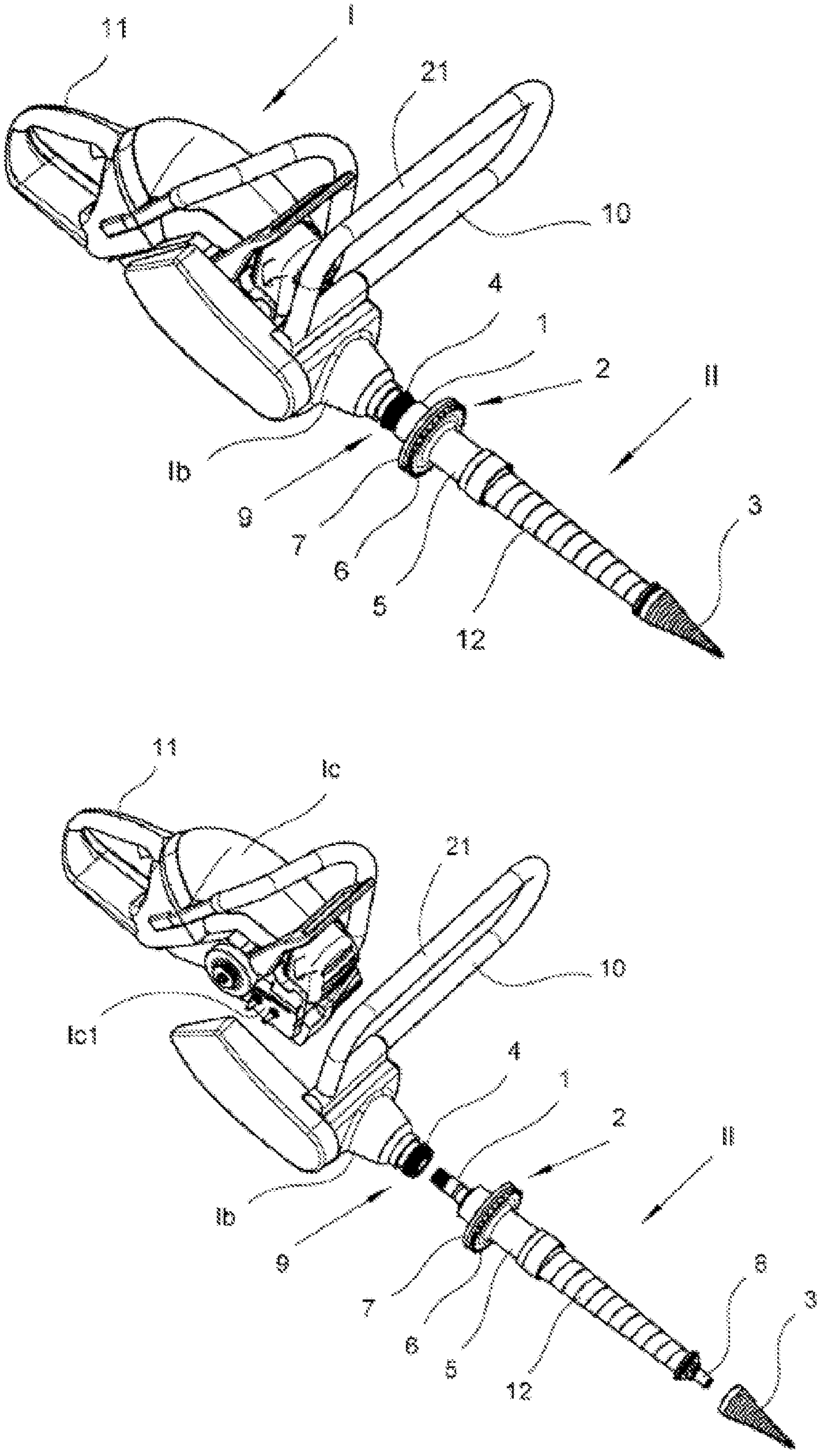
FIG. 2—is an overall arrangement of the device according to the invention in an axonometric view—a variant wherein the power unit of the device comprises a building kit of a chain saw power unit and a separate auxiliary gear box which will be attached dismantably onto the chain saw cutting blade flange (illustrated here in an operable configuration at the top and partially exploded at the bottom)

In other variant of the exemplary embodiment of the portable wood log splitter according to the invention (see FIG. 2) the power unit I is formed by a building kit of the chain saw power unit Ic and the independent auxiliary gear box Ib, which is fixed in a dismantable way onto the flange Ic1 of the chain saw cutting blade. In this variant the anti-torque bar (stop) 10, a part of which is also the first handle 21, is connected firmly with the independent auxiliary gear box Ib.

Further elements and components of the device are designed identically with Example 1.

Example 3

In another arrangement of the portable wood log splitter according to the invention the axis of the output shaft of the engine Ia is parallel to rotation axis of the output shaft 4 of the gear box Ib. In this case, the said gear box Ib is multi-gear one while the first and the last gear are formed with front gearwheels or can be arranged as a planet one.

Further elements and components of the device are designed identically with Example 1.

LIST OF REFERENCE SIGNS (REFERENCE NUMBERS)

I power unit
II work tool
Ia engine
Ib gear box
Ic chain saw power unit
Ic1 chain saw cutting blade flange
1 drive shaft
1*a* groove
1*b* drive shaft thread
2 spreading mechanism
3 splitting threaded cone
3*a* cone inlet opening
3*b* threaded cone recess
3*c* threaded cone opening
3*d* cone thread profile
4 gear box output shaft
5 nut
6 toothed disc
7 freely rotating circular disc
8 end stud
8*a* rectangular projection
8*b* shape off set
9 ball coupling
9*a* sleeve
9*b* compression spring
9*c* coupling balls
10 anti-torque bar (stop)
11 second handle
12 telescopic spiral spring
13 flat spring
13*a* flat spring hooks
14 bayonet coupling
15 belt drive
16 bevel gear
16*a* crown gear
16*b* pinion gear shaft
17 bearing
18 tube
19 ball valve
19*a* ball valve in the end stud
20 balls
21 first handle It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A portable wood log splitter comprising:
a power unit;
said power unit having an engine and a gearbox;
said gearbox including a gearbox output shaft;
a work tool;
said work tool including a drive shaft;
a spreading mechanism;
said spreading mechanism mounted on a first end of said drive shaft;
a splitting threaded cone;
said drive shaft comprising said splitting threaded cone coupled at a second end of said drive shaft;
wherein an outer circumference of said splitting threaded cone having a threaded profile;
said work tool releasably coupled to said gearbox output shaft;
said spreading mechanism having a nut and a toothed disc;
said nut having said toothed disc on an one end of said nut;
said drive shaft extending through said nut;
said nut with said toothed disc translatable axially when said drive shaft rotated;
a freely rotating circular disc;
said freely rotating circular disc positioned between said gear box output shaft and said toothed disc;
an end stud;
said end stud coupled to said drive shaft;
said end stud releasably connected to said splitting threaded cone;
a telescopic spiral spring;
said telescopic spiral spring encircling said drive shaft; and
said telescopic spiral spring biasing said nut and toothed disc towards said gearbox.

2. The portable wood log splitter of claim 1 further comprising:
said gear box output shaft having a central axis;
a ball coupling;
a sleeve;
said gear box output shaft encircled by said sleeve;
said drive shaft having a groove operable to seat a ball;
a ball coupling;
said ball coupling comprising a ball;
a compression spring encircling said gear box output shaft;
said ball coupling operable manually by axially shifting said sleeve;
whereby said sleeve blocks said ball against movement perpendicular to said central axis in a locked position thereby providing for torque transferring between said gearbox output shaft and said drive shaft.

3. The portable wood log splitter of claim 1 further comprising:
said end stud extending from said drive shaft;
wherein a bayonet coupling is utilized for coupling and uncoupling of said splitting threaded cone to said end stud.

4. The portable wood log splitter of claim 3 further comprising:
a bayonet coupling;
said splitting threaded cone comprising an inlet opening;
a recess adjacent said inlet opening;
said bayonet coupling comprising said end stud seated in said recess; and
said end stud rotated in said recess between 10 and 90 degrees thereby securing said splitting cone against an axial movement.

5. The portable wood log splitter of claim 1, where in said power unit having said gear box that is inseparable from said engine.

6. The portable wood log splitter according to claim 5 further comprising:
said engine having an engine output shaft;
said engine output shaft having a central axis;
said gear box output shaft comprising a central axis;
said central axis of said gear box output shaft situated perpendicular to said central axis of said engine output shaft;
a belt drive;
said gear box comprising two gears coupled by said belt drive;
a pinion gear shaft driven by one of said two gears;
a crown gear;
said pinion gear shaft drives said crown gear; and
said gear box output shaft is consequently driven by said crown gear.

7. The portable wood log splitter of claim 6 further comprising:
a bevel gear;
said bevel gear self-locking in said gear box;
said bevel gear having a pinion gear shaft and a crown gear;
wherein said pinion gear shaft is adjacent said crown gear; and
bearings positioned on each end of said pinion gear shaft.

8. The portable wood log splitter of claim 5 further comprising:
said engine having an engine output shaft;
said engine output shaft having an engine output shaft central axis;
said gear box comprising a gear box output central axis;
said engine output shaft central axis being parallel to said gear box output central axis;
said gear box is multi-gear;
wherein said gear box is formed by gear wheels or planet one.

9. The portable wood log splitter of claim 5 further comprising:
said gearbox output shaft having a central axis;
an anti-torque bar operable to eliminate reaction torque generated during operation;
said anti-torque bar fixed to one of said power unit and said gear box;
wherein longitudinal axis of said anti-torque bar is angled between 60 and 120 degrees from said central axis of said gear box output shaft.

10. The portable wood log splitter of claim 5 further comprising:
a first handle operable for controlling said portable wood log splitter;
a second handle;
said second handle coupled to said power unit;
a revolution controller;
said second handle having a central axis; and
wherein said central axis of said second handle is parallel to a central axis of said work tool in an operable mode.

11. The portable wood log splitter of claim 1 further comprising:
a building kit operable to form said power unit;
said power unit comprising a chain saw power unit;

said chain saw power unit comprising a chain saw cutting blade flange on said chain saw power unit;

said building kit comprising said chain saw power unit and said gear box;

wherein said gear box is removably fixed to said chain saw cutting blade flange.

12. The portable wood log splitter of claim 1 further comprising:

said drive shaft having a drive shaft thread on an outer circumference of said drive shaft; and said drive shaft and said nut are configured as A or B wherein:

A) said drive shaft thread being trapezoidal, and said nut directly interfaces said drive shaft through said trapezoidal thread, or B) said portable wood log splitter further comprises balls; and wherein said drive shaft thread and said nut operate with said balls therebetween for operation as a ball screw.

13. The portable wood log splitter of claim 1 further comprising:

said end stud having a central axis;

said end stud coupled to said drive shaft at a distal end;

said end stud having a pair of opposed rectangular projections spaced 180 degrees from each other;

said opposed rectangular projections having a shape offset;

said opposed rectangular projections situated perpendicular to said central axis of said end stud;

a cone inlet opening in said splitting threaded cone;

said cone inlet opening expanding into a threaded cone recess;

wherein the profile of said cone inlet opening is configured to pass said pair of said opposed rectangular projections through said cone inlet opening in a first position; and wherein said opposed rectangular projections are secured within said threaded cone recess when said end stud is rotated to a second position.

14. The portable wood log splitter of claim 1 further comprising:

an inlet opening in said splitting threaded cone at one end;

said end stud at a distal end of said drive shaft;

a recess extending from said inlet opening configured to receive said end stud therein; and a spring housed within said splitting threaded cone.

15. The portable wood log splitter of claim 1, wherein said thread profile of said splitting threaded cone has a surface roughness, and wherein said surface roughness is less than Ra 0.4 um.

16. The portable wood log splitter of claim 1 further comprising:

a tube;

said tube containing a lubricating oil;

said tube supplying said lubricating oil to said cone thread profile;

one or more hydraulic valves;

said drive shaft being a hollow;

said lubricating oil flowing through said hollow of said drive shaft;

said splitting threaded cone having a cone inlet opening;

said one or more hydraulic valves operable to control flow of said lubricating oil; and wherein said lubricating oil is conveyed on said cone thread profile of said splitting threaded cone by the gravitational force.

17. The portable wood log splitter of claim 1 further comprising:

a tube;

said tube supplying a lubricating oil to said cone thread profile;

a spring;

wherein said lubricating oil is dispensed consequent an up to 10 mm shift of said splitting threaded cone on said end stud towards said power unit by an applied axial force; and wherein compressed said spring shifts said splitting threaded cone on said end stud away from said power unit when said axial force is removed.

18. A portable wood log splitter comprising:

a power unit;

a gear box;

said gear box coupled to said power unit;

a work tool;

said work tool having a drive shaft;

said drive shaft coupled to said gear box;

said drive shaft having a drive shaft thread on an outer circumference of said drive shaft;

a splitting threaded cone;

said splitting threaded cone coupled to one end of said drive shaft and operable to fracture a log when driven into said log under a power transmitted from said power unit thereby producing fractured logs;

a spreading mechanism;

said spreading mechanism having a nut and a toothed disc;

said nut fixed to said toothed disc;

a freely rotating circular disc; and wherein said nut with said toothed disc translates down said drive shaft thread causing consequent separation between said freely rotating circular disc and said toothed disc and thereby operable to separate said fractured logs when said toothed disc and said freely rotating circular disc are placed in the fracture of said fractured log.

19. The portable wood log splitter of claim 18, wherein said work tool is releasable from said power unit and wherein said work tool and said power unit are provided as a kit.

* * * * *